(12) United States Patent
Hashimoto et al.

(10) Patent No.: US 6,880,512 B2
(45) Date of Patent: Apr. 19, 2005

(54) BALANCER DEVICE FOR ENGINE

(75) Inventors: Hisayuki Hashimoto, Saitama (JP); Kazuhito Okazaki, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/319,813

(22) Filed: Dec. 16, 2002

(65) Prior Publication Data

US 2003/0145821 A1 Aug. 7, 2003

(30) Foreign Application Priority Data

Dec. 18, 2001 (JP) ........................................ 2001-384302
Dec. 18, 2001 (JP) ........................................ 2001-384303

(51) Int. Cl.[7] ................................................ F02B 75/06
(52) U.S. Cl. ................................ 123/192.2; 123/196 R
(58) Field of Search ........................... 123/192.2, 196 R

(56) References Cited

FOREIGN PATENT DOCUMENTS

| DE | 199 47 271 A1 | 4/2000 |
|---|---|---|
| EP | 1 081 344 A1 | 3/2001 |
| EP | 1 081 410 A1 | 3/2001 |
| EP | 1 081 410 B1 | 3/2001 |
| JP | 62-28937 | 2/1987 |
| JP | 1-61415 | 4/1989 |
| JP | 6-17879 | * 1/1994 |
| JP | 6-017879 | 1/1994 |
| JP | 7-22004 | 4/1995 |
| JP | 08-068152 | 3/1996 |
| JP | 08-248859 | 9/1996 |
| JP | 2000-065150 | 3/2000 |
| JP | 2000-140790 | 4/2000 |
| JP | 2001-018653 | 1/2001 |
| JP | 2001-074104 | 3/2001 |
| JP | 2001-140985 | 5/2001 |

* cited by examiner

Primary Examiner—Noah P. Kamen
(74) Attorney, Agent, or Firm—Armstrong, Kratz, Quintos, Hanson & Brooks, LLP

(57) ABSTRACT

A balancer housing of a balancer device disposed to face an oil pan below a crankshaft of an engine, includes oil discharge bores for discharging an oil accumulated in the balancer housing with the rotation of balancer weights. The oil discharge bores are covered by baffle plates for inhibiting the turbulence of a surface of the oil stored in the oil pan. Thus, it is possible to inhibit the entrance of the oil into the balancer housing through the oil discharge bores without provision of a special cover member for covering the oil discharge bores.

6 Claims, 19 Drawing Sheets

BALANCER DEVICE FOR ENGINE

BACKGROUND OF THE INVENTION

1. Field of the Invention

The present invention relates to a balancer device for an engine, including a balancer housing disposed below a crankshaft to face an oil pan.

2. Description of the Related Art

Such balancer devices for engines are known from Japanese Patent Application Laid-open No. 2001-140985 and Japanese Utility Model Application Laid-open No.1-61415.

In the balancer device described in Japanese Patent Application Laid-open No. 2001-140985, an oil accumulated within the balancer housing is raked up by a rotating balancer, and such oil is discharged to the outside through a clearance defined in a side of the balancer housing. In the balancer device described in Japanese Utility Model Application Laid-open No. 1-61415, an upper portion of a discharge bore provided in an upper surface of the balancer housing for discharging a blow-by gas is covered with a cover member, whereby the discharge bore is prevented from being clogged with the oil.

The balancer device described in Japanese Patent Application Laid-open No. 2001-140985 does not have a cover member for covering the clearance in the balancer housing and hence, there is a possibility that the oil splashed up in a crankcase by the crankshaft may enter the balancer housing through the clearance. To prevent this, it is conceived that the clearance in the balancer housing is covered with the cover member described in Japanese Utility Model Application Laid-open No. 1-61415. However, if the clearance is covered as described above, a special cover member is disadvantageously required, resulting in increases in the number of parts and the number of assembling steps.

SUMMARY OF THE INVENTION

Accordingly, it is an object of the present invention to ensure that the entrance of the oil into the balancer housing through the oil discharge bores is inhibited without provision of a special cover member.

To achieve the above object, according to a first feature of the present invention, there is provided a balancer device for an engine, comprising a balancer housing disposed below a crankshaft to face an oil pan, wherein at least a portion of a baffle plate for inhibiting a turbulence of a surface of an oil stored in the oil pan is extended to a location where it covers an opening defined in the balancer housing.

With the above arrangement, at least a portion of the baffle plate for inhibiting the turbulence of the surface of the oil stored in the oil pan is extended to cover the opening defined in the balancer housing and hence, the oil splashed up by the crankshaft can be prevented from entering the balancer housing through the opening by utilizing the existing baffle plate. Thus, a special cover member for covering the opening is not required to be mounted, which can contribute to reductions in the number of parts and the number of assembling steps.

According to a second feature of the present invention, in addition to the first feature, the baffle plate has a plurality of cover portions for respectively covering a plurality of the openings, and a notch or a bore is defined between the cover portions.

With the above arrangement, the notch or the bore is defined between the cover portions of the baffle plate to respectively cover the openings, and hence an increase in weight of the baffle plate can be minimized.

According to a third feature of the present invention, in addition to the second feature, the notch or the bore is provided at a location opposed to a balancer weight having a diameter larger than that of a journal of a balancer shaft.

With the above arrangement, the notch or the bore in the baffle plate is provided at the location opposed to the balancer weight of the balancer shaft and hence, an increase in vertical dimension of the engine due to the provision of the baffle plate can be minimized.

According to a fourth feature of the present invention, in addition to the second or third feature, a location at which the baffle plate is fastened to a support member is a location closer to the cover portions than to the notch or the bore.

With the above arrangement, the baffle plate is fastened to the support member in the position closer to the cover portions than to the notch or the bore and hence, the rigidity of the cover portions can be increased to inhibit the generation of a vibration.

According to a fifth feature of the present invention, in addition to the first feature, a projection or a recess for inhibiting the flowing of the oil into a clearance defined between an upper surface of the balancer housing and an end edge of the baffle plate is formed on an upper surface of the balancer housing in order to inhibit the entrance of the oil into the opening through the clearance.

With the above arrangement, the projection or the recess is formed on the upper surface of the balancer housing to inhibit the flowing of the oil into the clearance defined between the upper surface of the balancer housing having the openings and the end edge of the baffle plate covering the opening. Therefore, it is possible to inhibit the entrance of the oil into the opening through the clearance by shielding the flow of the oil by the projection or the bore.

According to a sixth feature of the present invention, in addition to the first feature, a projection for inhibiting the flowing of the oil into a clearance defined between an upper surface of the balancer housing and an end edge of the baffle plate is formed on the upper surface of the balancer housing to protrude upwards to a level higher than the end edge of the baffle plate in order to inhibit the entrance of the oil into the opening through the clearance.

With the above arrangement, the projection is formed on the upper surface of the balancer housing to protrude upwards to the level higher than the end edge of the baffle plate in order to inhibit the flowing of the oil into the clearance defined between the upper surface of the balancer housing having the opening and the end edge of the baffle plate covering the opening. Therefore, it is possible to inhibit the entrance of the oil into the opening through the clearance by shielding the flow of the oil by the projection, and the projection can contribute to an increase in rigidity of the balancer housing.

According to a seventh feature of the present invention, in addition to the fifth or sixth feature, the length of the projection or the recess in a direction of the balancer shaft is set to be larger than the length of the opening in the direction of the balancer shaft.

With the above arrangement, the length of the projection or the recess is larger than the length of the opening and hence, it is possible to reliably blocking the oil by the projection or the recess to inhibit the entrance of the oil into the opening further effectively.

According to an eighth feature of the present invention, in addition to the sixth feature, the balancer housing has bearing portions for supporting journals of two balancer shafts, and a gear-accommodating portion for accommodating gears adapted to drive the two balancer shafts in operable association with each other, the bearing portions and the gear-accommodating portion being projectingly provided on the upper surface of the balancer housing and connected to each other by the projection.

With the above arrangement, the bearing portions and the gear-accommodating portion protruding from the upper surface of the balancer housing are connected to each other by the projection and hence, the rigidity of the balancer housing can be increased to reliably support the balancer shafts.

A lower block 14 in each of embodiments corresponds to the support member of the present invention; a driving balancer shaft 18 and a follower balancer shaft 19 in each of the embodiment correspond to the balancer shafts of the present invention; first and second journals 18a, 19a; 18d, 19d in each of the embodiments correspond to the journals of the present invention; a driving gear 18b and a follower gear 19b in each of the embodiments correspond to the gears of the present invention; second balancer weights 18e, 19e in each of the embodiments correspond to the balancer weights of the present invention; oil discharge bores 45a to 45d and 46 in each of the embodiments correspond to openings of the present invention; first, second and third baffle plates 47, 48 and 49 in each of the embodiments correspond to the baffle plate of the present invention; and inner end edges 47a and 48a in each of the embodiments correspond to the end edge of the present invention.

The above and other objects, features and advantages of the invention will become apparent from the following description of the preferred embodiments taken in conjunction with the accompanying drawings.

BRIEF DESCRIPTION OF THE DRAWINGS

FIGS. 1 to 12 show a first embodiment of the present invention, wherein

FIG. 1 is a front view of an engine;

FIG. 2 is a sectional view taken along a line 2—2 in FIG. 1;

FIG. 3 is a sectional view taken along a line 3—3 in FIG. 2;

FIG. 4 is a sectional view taken along a line 4—4 in FIG. 2;

FIG. 5 is a sectional view taken along a line 5—5 in FIG. 3;

FIG. 6 is a sectional view taken along a line 6—6 in FIG. 2;

FIG. 7 is a sectional view taken along a line 7—7 in FIG. 2;

FIG. 8 is a sectional view taken along a line 8—8 in FIG. 6;

FIG. 9 is a sectional view taken along a line 9—9 in FIG. 6;

FIG. 10 is a sectional view taken along a line 10—10 in FIG. 6;

FIG. 11 is a sectional view taken along a line 11—11 in FIG. 6;

FIG. 12 is a sectional view taken along a line 12—12 in FIG. 6;

FIGS. 15 to 18 show a fourth embodiment of the present invention, wherein FIG. 15 is a view similar to FIG. 6;

FIG. 16 is a view similar to FIG. 7;

FIG. 17 is a sectional view taken along a line 17—17 in FIG. 15;

FIG. 18 is a sectional view taken along a line 18—18 in FIG. 15.

DESCRIPTION OF THE PREFERRED EMBODIMENTS

The present invention will now be described by way of the first embodiment with reference to FIGS. 1 to 12.

Figure 1:
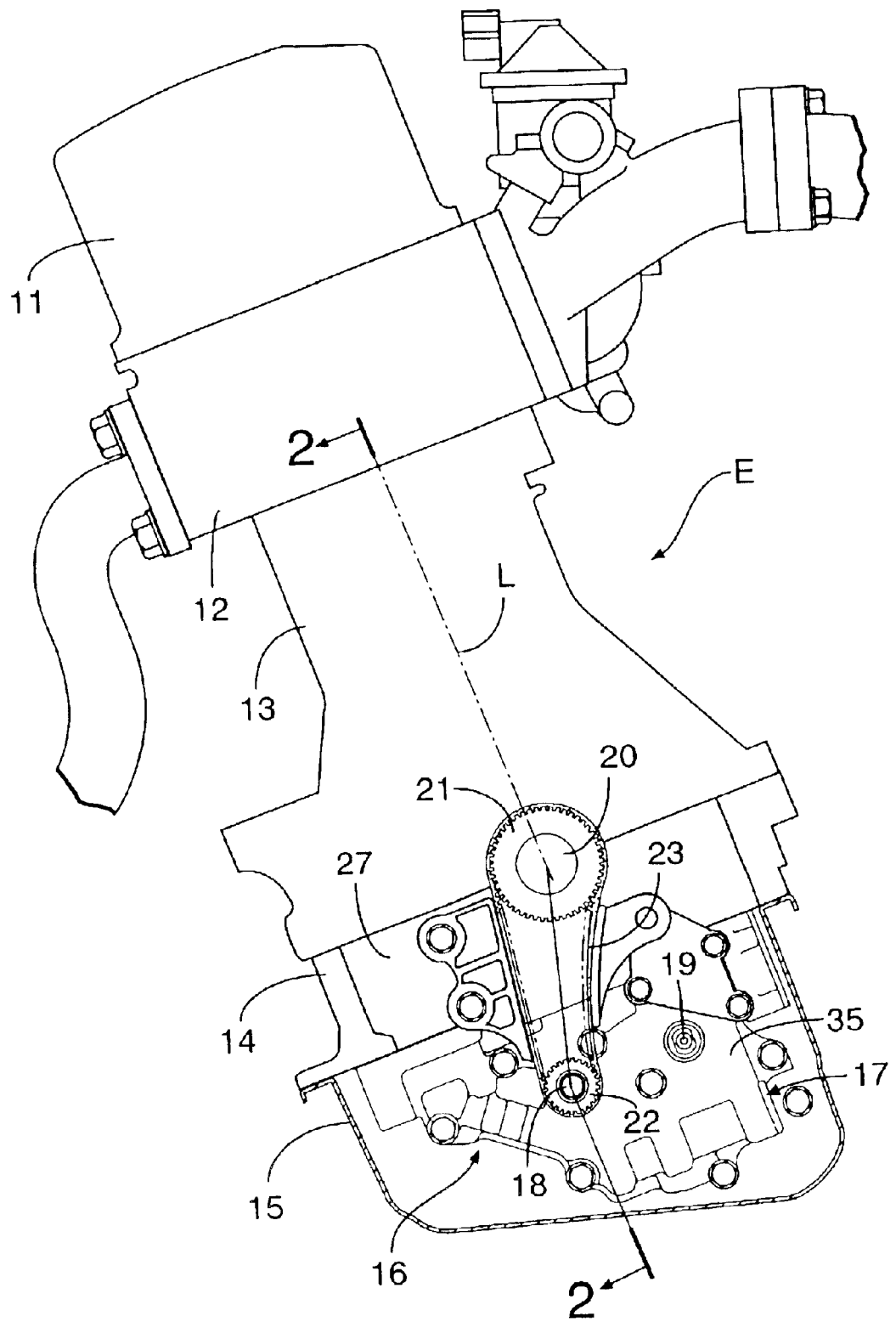
Figure 2:
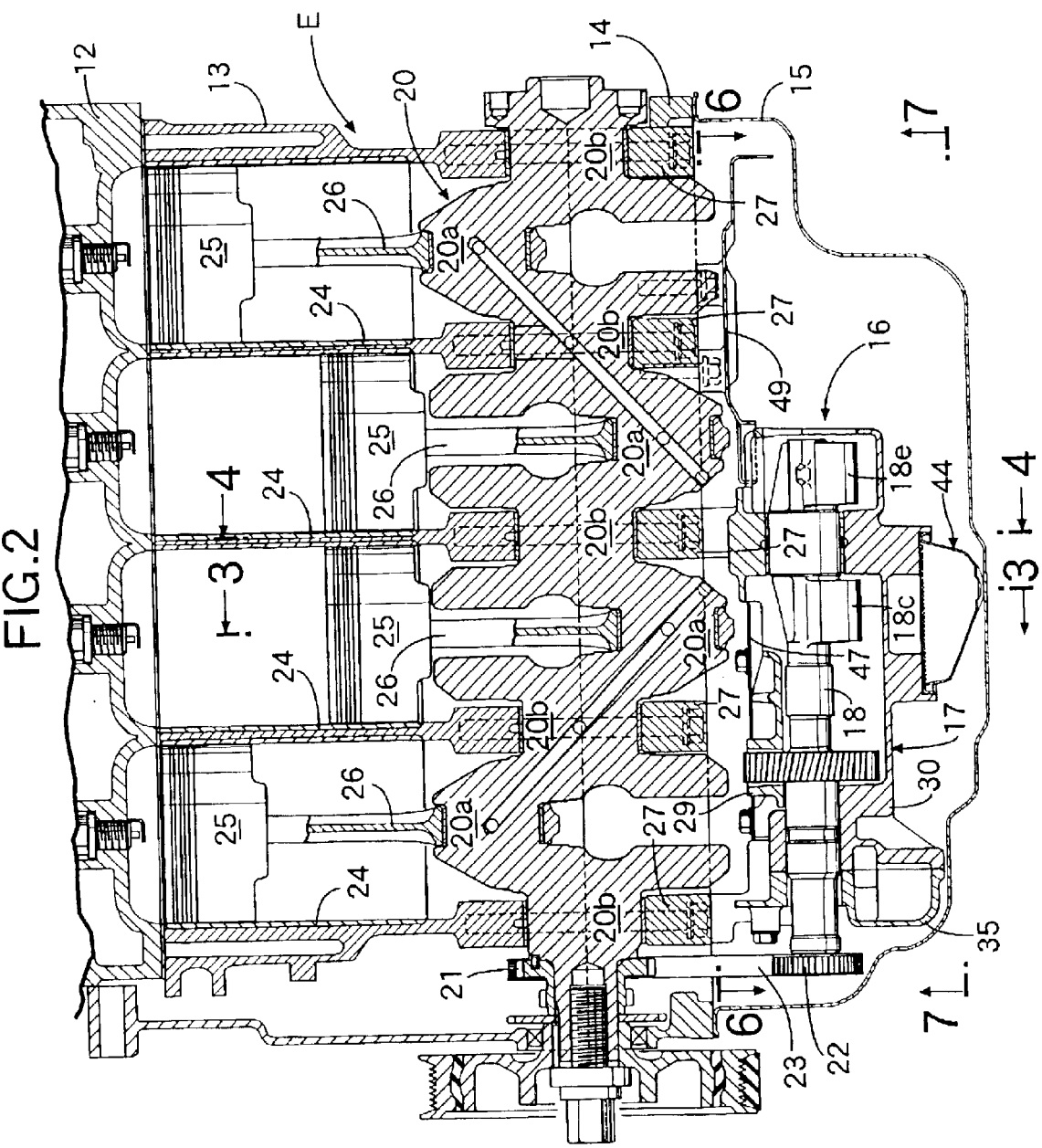
Figure 3:
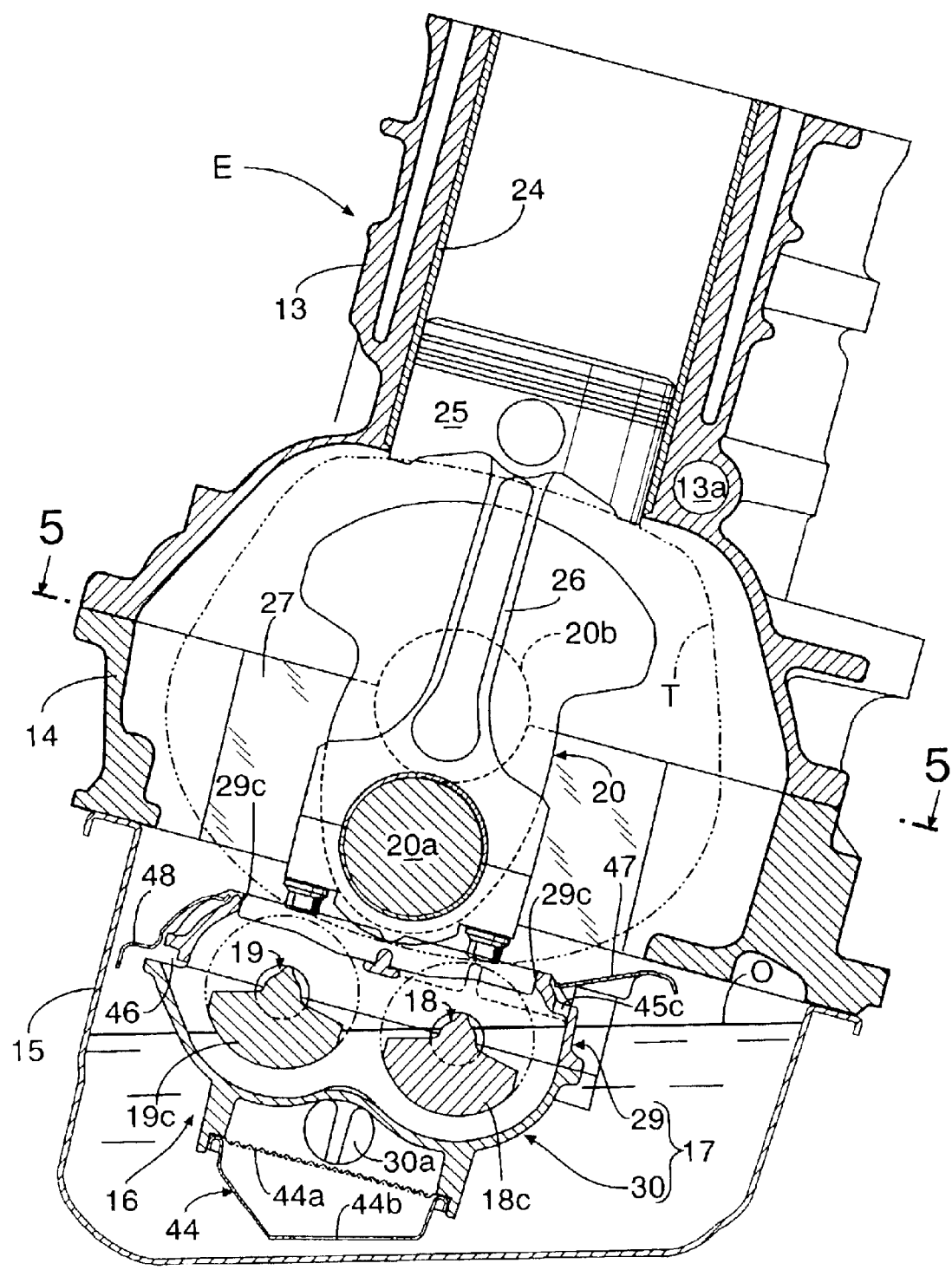
Figure 4:
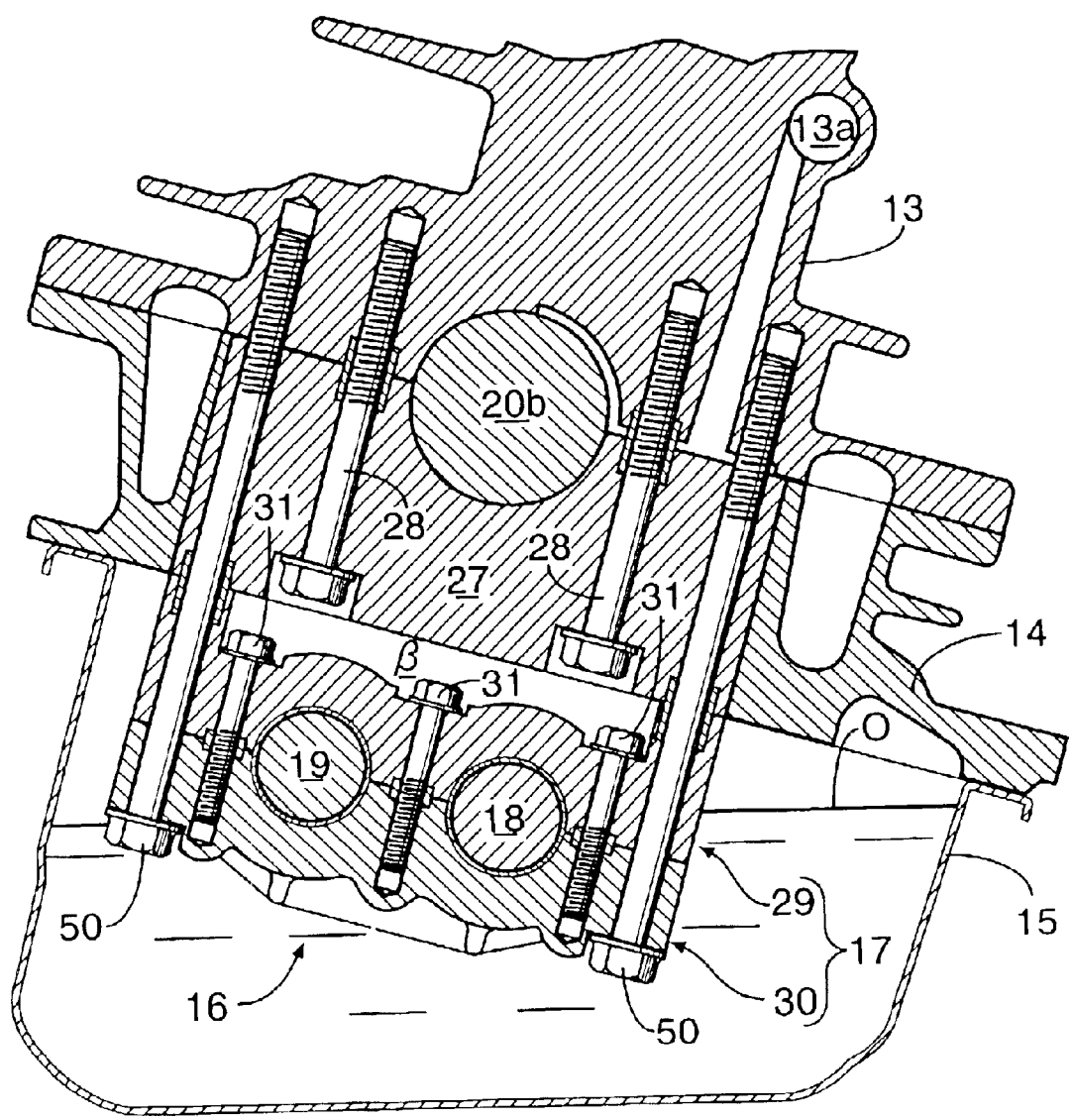
Figure 5:
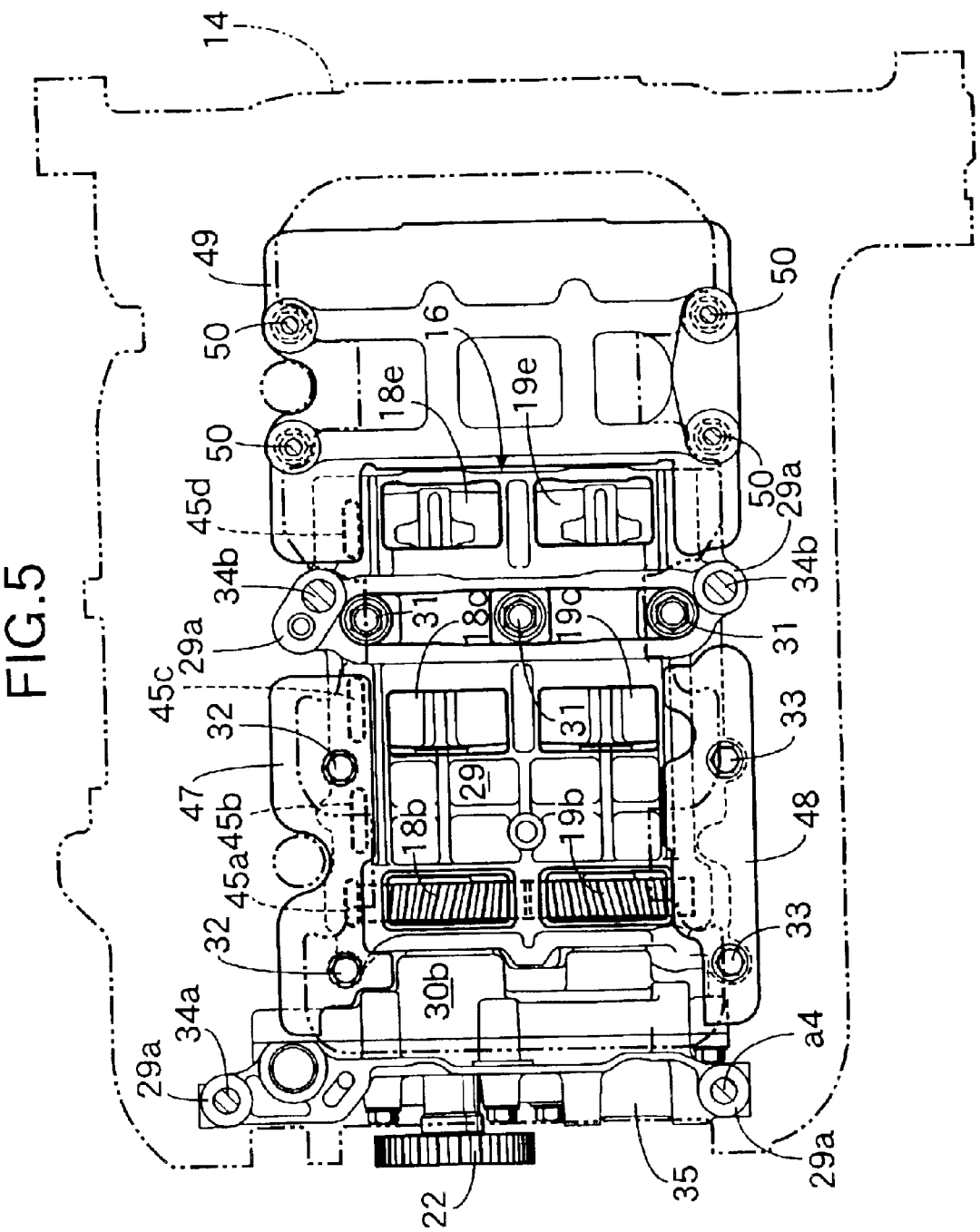

As shown in FIG. 1, the contour of an in-line 4-cylinder engine E for a vehicle is formed by disposing a head cover 11, a cylinder head 12, a cylinder block 13, a lower block 14 and an oil pan 15 in the named order from top to bottom. A cylinder axis L is inclined toward an exhaust side (leftwards as viewed in FIG. 1) with respect to a vertical direction. A secondary balancer device 16 fixed to a lower surface of the lower block 14 and accommodated in the oil pan 15 includes a driving balancer shaft 18 and a follower balancer shaft 19 supported in a balancer housing 17. A sprocket 21 mounted at an end of a crankshaft 20 supported between the cylinder block 13 and the lower block 14 and a sprocket 22 mounted at an end of the driving balancer shaft 18 are connected to each other by an endless chain 23.

As shown in FIGS. 2 to 5, four pistons slidably received in four cylinder bores 24 provided in the cylinder block 13 are connected to four pins 20a of the crankshaft 20 through connecting rods 26, respectively. Each of five bearing caps 27 fitted in the lower block 14 is fastened to a lower surface of the cylinder block 13 by two bolts 28, 28. Five journals 20b of the crankshaft 20 are rotatably supported between the cylinder block 13 and the five bearing caps 27.

The balancer housing 17 of the secondary balancer device 16 has an upper housing element 29 and a lower housing element 30 which are coupled to each other by eleven bolts 31; 32, 32; 33, 33; 34a, 34a and 34b, 34b, and a pump housing 35 coupled to one end of each of the upper housing element 29 and the lower housing element 30 by a plurality of bolts 36. An upper wall 30b is formed at an end of the lower housing element 30 adjacent the pump housing 35 to extend over an upper surface of the balancer housing 17, and is sandwiched between the upper housing element 29 and the pump housing 35. At this time, a slit-shaped opening α (FIGS. 6, 8 and 9) is defined between the upper housing element 29 and the upper wall 30b of the lower housing element 30.

The three bolts 31 disposed to sandwich each of the driving balancer shaft 18 and the follower balancer shaft 19 between the adjacent two bolts 31 are inserted from the side of the upper housing element 29 and fastened to the lower housing element 30. The two bolts 32, 32 disposed outside the driving balancer shaft 18 and the two bolts 33, 33 disposed outside the follower balancer shaft 19 are inserted from the side of the upper housing element 29 and fastened to the lower housing element 30. The two bolts 34a, 34a inserted into the pump housing 35 at one end of the balancer housing 17 are passed through the bearing cap 27 and fastened to the lower surface of the cylinder block 13. The two bolts 34b, 34b inserted from the lower housing element 30 side at one end of the balancer housing 17 are passed through the upper housing element 29 and the bearing cap 27 and fastened to the lower surface of the cylinder block 13.

The upper housing element 29 is supported on the bearing caps 27, 27 by four mounting seats 29a through which the four bolts 34a, 34a, 34b, 34b pass, and hence a clearance β (see FIG. 4) is defined between an upper surface of the upper housing element 29 and lower surfaces of the bearing caps 27, 27.

The structure of the secondary balancer device 16 will be further described with reference to FIGS. 6 to 12.

Figure 8:
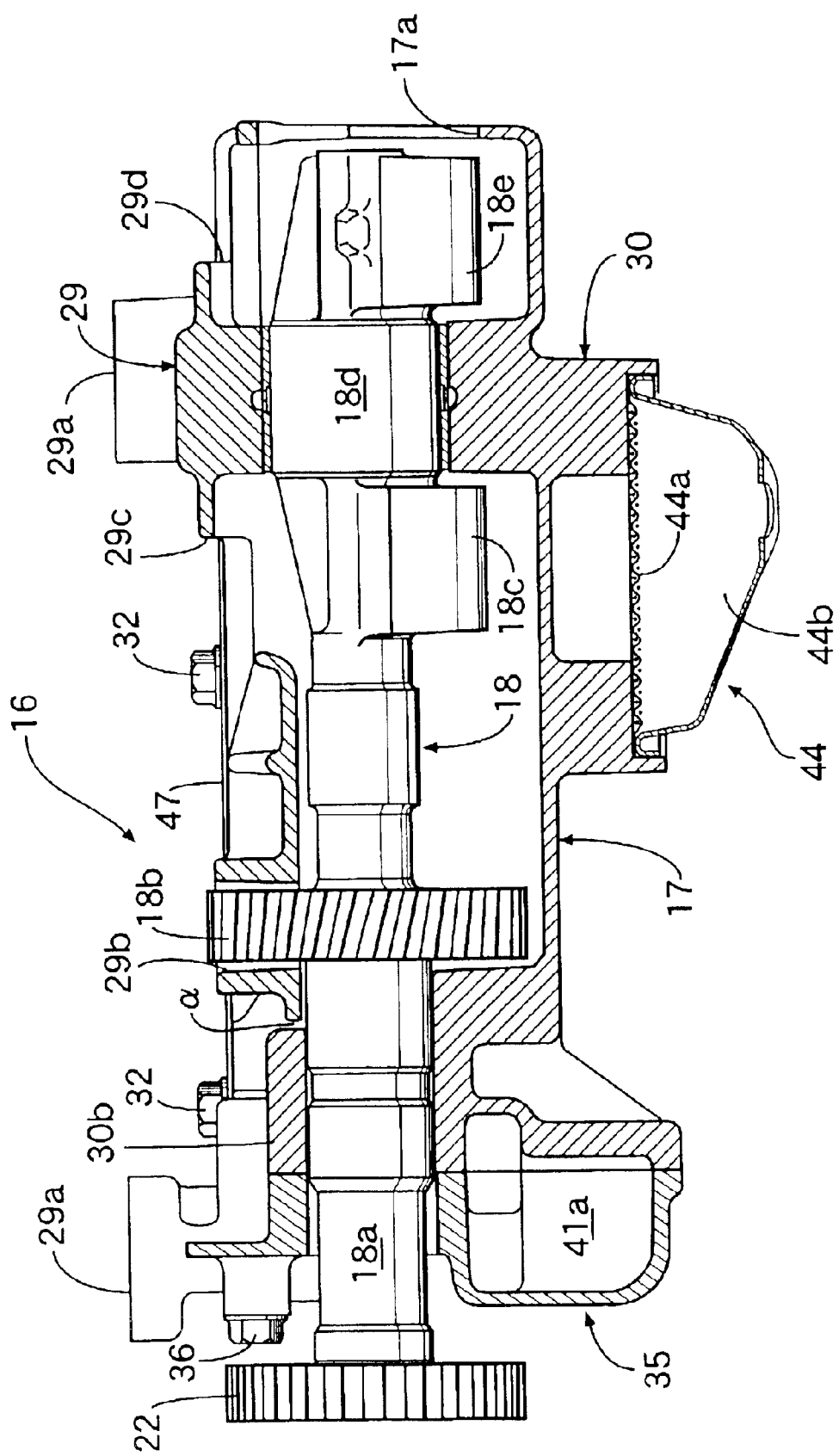
Figure 9:
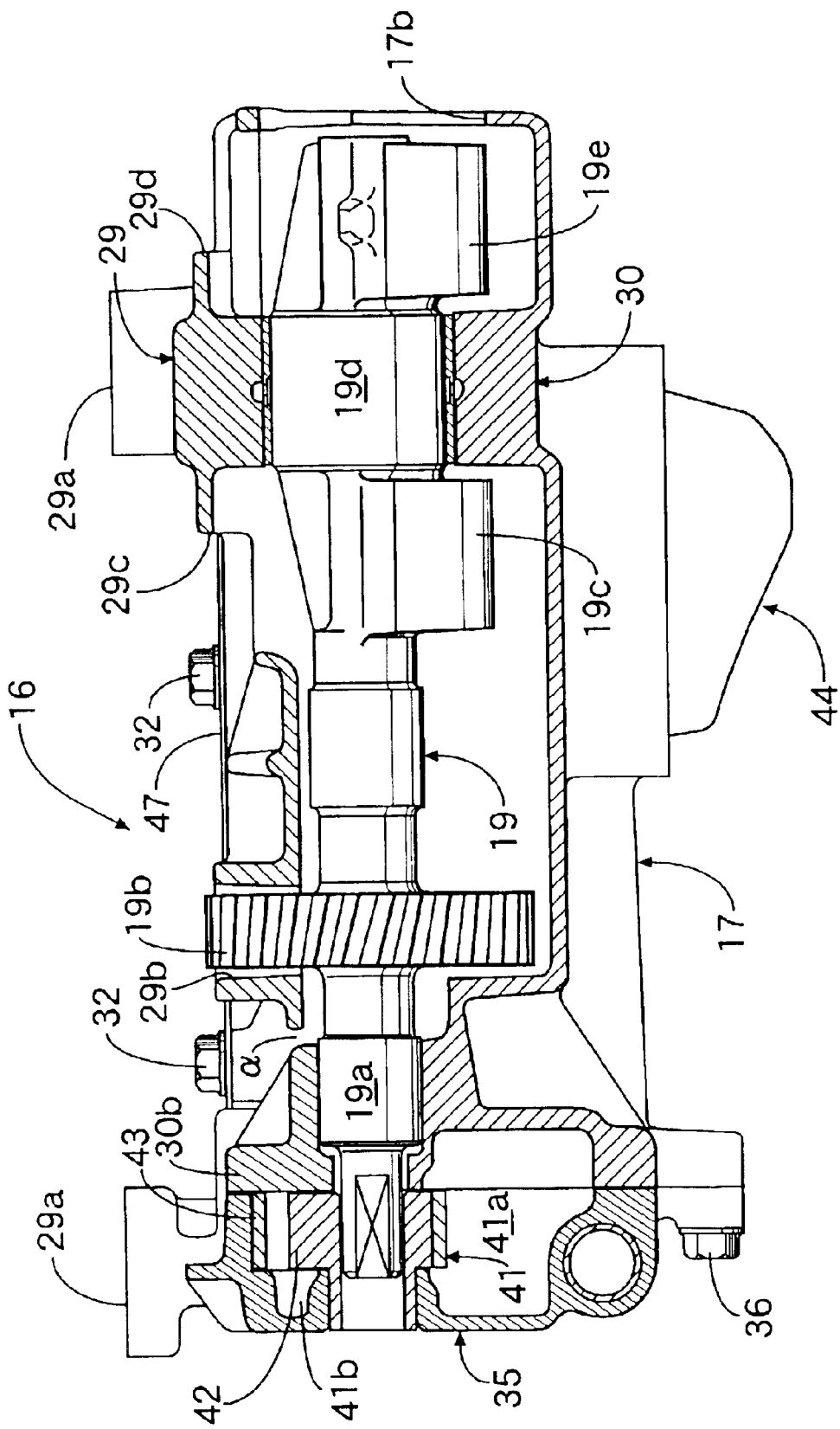

As can be seen from FIG. 8, the driving balancer shaft 18 of the secondary balancer device 16 is provided with the sprocket 22, a first journal 18a, a driving gear 18b, a first balancer weight 18c, a second journal 18d and a second balancer weight 18e in the named order from one end toward the other end thereof. The first and second journal 18a and 18d are supported so that they are sandwiched between the upper housing element 29 and the lower housing element 30. As can be seen from FIG. 9, the follower balancer shaft 19 of the secondary balancer device 16 is provided with a first journal 19a, a follower gear 19b, a first balancer weight 19c, a second journal 19d and a second balancer weight 19e in the named order from one end toward the other end thereof. The first and second journals 19a and 19d are supported so that they are sandwiched between the upper housing element 29 and the lower housing element 30.

An oil pump 41 (see FIG. 9) is mounted at one end of the follower balancer shaft 19 protruding into the pump housing 35. The oil pump 41 is a well-known trochoid pump and includes an inner rotor 42 fixed to the follower balancer shaft 19, and an outer rotor 43 rotatably supported in the pump housing 35 and meshed with the inner rotor 42. A strainer 44 is mounted on a lower surface of the lower housing element 30 and located below a surface O of an oil stored in the oil pan 15. The strainer 44 and an intake port 41a of the oil pump 41 are connected to each other by an oil passage 30a (see FIG. 12) defined integrally in the lower surface of the lower housing element 30. The strainer 44 is comprised of a strainer element 44a for filtering a foreign matter in the oil, and a strainer cover 44b which covers the strainer element 44a. A discharge port 41b of the oil pump 41 is connected to a main gallery 13a (see FIGS. 3 and 4) in the cylinder block 13 through an oil passage (not shown).

Defined in the upper housing element 29 are a pair of openings 29b, 29b which the driving gear 18b and the follower gear 19b face, a pair of openings 29c, 29c which the first balancer weights 18c and 19c face, and a pair of openings 29d, 29d which the second balancer weights 18e and 19e face. The provision of the openings 29b, 29b; 29c, 29c; 29d, 29d prevents loci T (see FIG. 3) of lower ends of the connecting rods 26 from interfering with the upper surface of the upper housing element 29 and hence, a reduction in size of the engine E can be achieved. Openings 17a and 17b (see FIG. 10) are also provided in an end face of the balancer housing 17 opposite from the pump housing 35 astride the upper housing element 29 and the lower housing element 30 to face ends of the driving balancer shaft 18 and the follower balancer shaft 19. The openings 17a and 17b serve for forming support portions for the first and second journals 18a, 19a; 18d, 19d of the driving balancer shaft 18 and the follower balancer shaft 19 within the balancer housing 17 by machining, and have inner diameters slightly larger than outer diameters of the first and second journals 18a, 19a; 18d, 19d.

Four oil discharge bores 45a, 45b, 45c and 45d are defined in an end of the upper housing element 29 adjacent the driving balancer shaft 18, and open into the upper surface of the upper housing element 29. Each of the oil discharge bores 45a, 45b, 45c and 45d is formed into an elongated shape to extend in an axial direction of the crankshaft 20. A single (or a plurality of) slit-shaped oil discharge bore 46 is defined in an end of the balancer housing 17 adjacent the follower balancer shaft 19 to extend along mating surfaces of the upper housing element 29 and the lower housing element 30. The oil discharge bores 45a to 45d open in a direction along the cylinder axis L, and the oil discharge bore 46 opens in a direction perpendicular to the cylinder axis L. As a result of the inclination of the cylinder axis L, the balancer housing 17 is inclined, so that its portion on the side of the balancer shaft 18 is lower in level, and its portion on the side of the follower balancer shaft 19 is higher in level, but the oil discharge bores 45a to 45d on the side of the driving balancer shaft 18 and the oil discharge bore 46 on the side of the follower balancer shaft 19 are disposed at locations higher in level than the surface O (see FIG. 3) of the oil stored in the oil pan 15.

A substantially oblong first baffle plate 47 is clamped to the upper surface of the upper housing element 29 at its end adjacent the driving balancer shaft 18 by the two bolts 32, 32 for coupling the upper housing element 29 and the lower housing element 30 to each other, and a substantially oblong second baffle plate 48 is clamped to the upper surface of the upper housing element 29 at its end adjacent the follower balancer shaft 19 by the two bolts 33, 33 for coupling the upper housing element 29 and the lower housing element 30 to each other and hence, it is possible to provide reductions in the number of parts and fastening spaces. Further, a third angular U-shaped baffle plate 49 is fixed to the lower surface of the lower block 14 by four bolts 50.

Thus, the rotation of the crankshaft 20 is transmitted through the sprocket 21, the endless chain 23 and the sprocket 22 to the driving balancer shaft 18 by the operation of the engine E, and the rotation of the driving balancer shaft 18 is transmitted through the driving gear 18b and the follower gear 19b to the follower balancer shaft 19. In this arrangement, because the number of teeth of the sprocket 21 of the crankshaft 20 is set two times the number of teeth of the sprocket 22 of the driving balancer shaft 18, and the number of teeth of the driving gear 18b is set equal to the number of teeth of the follower gear 19b, the driving balancer shaft 18 and the follower balancer shaft 19 are rotated in opposite directions at rotational speeds two times the rotational speed of the crankshaft 20 (see arrows A and B in FIGS. 11 and 12), and the secondary vibration of the engine E is reduced by the first and second balancer weights 18c, 19c; 18e, 19e mounted on the driving balancer shaft 18 and the follower balancer shaft 19.

During operation of the engine E, the oil in a crankcase is splashed up by the crankshaft 20 to enter the balancer housing 17 through the openings 29b, 29b; 29c, 29c; 29d, 29d; 17a, 17b. If the oil entered the balancer housing 17, the following problem is encountered: The oil is agitated by the driving gear 18b, the follower gear 19b, the first and second balancer weights 18c, 19c; 18e, 19e and the like, resulting in an increase in agitation resistance. Therefore, the oil raked up by the driving gear 18b, the follower gear 19b, the first and second balancer weights 18c, 19c; 18e, 19e and the like of the driving balancer shaft 18 and the follower balancer shaft 19 is discharged to the outside from the oil discharge bores 45a to 45d and 46 in the balancer housing 17 and returned to the oil pan 15, thereby preventing the increase in agitation resistance.

Figure 10:
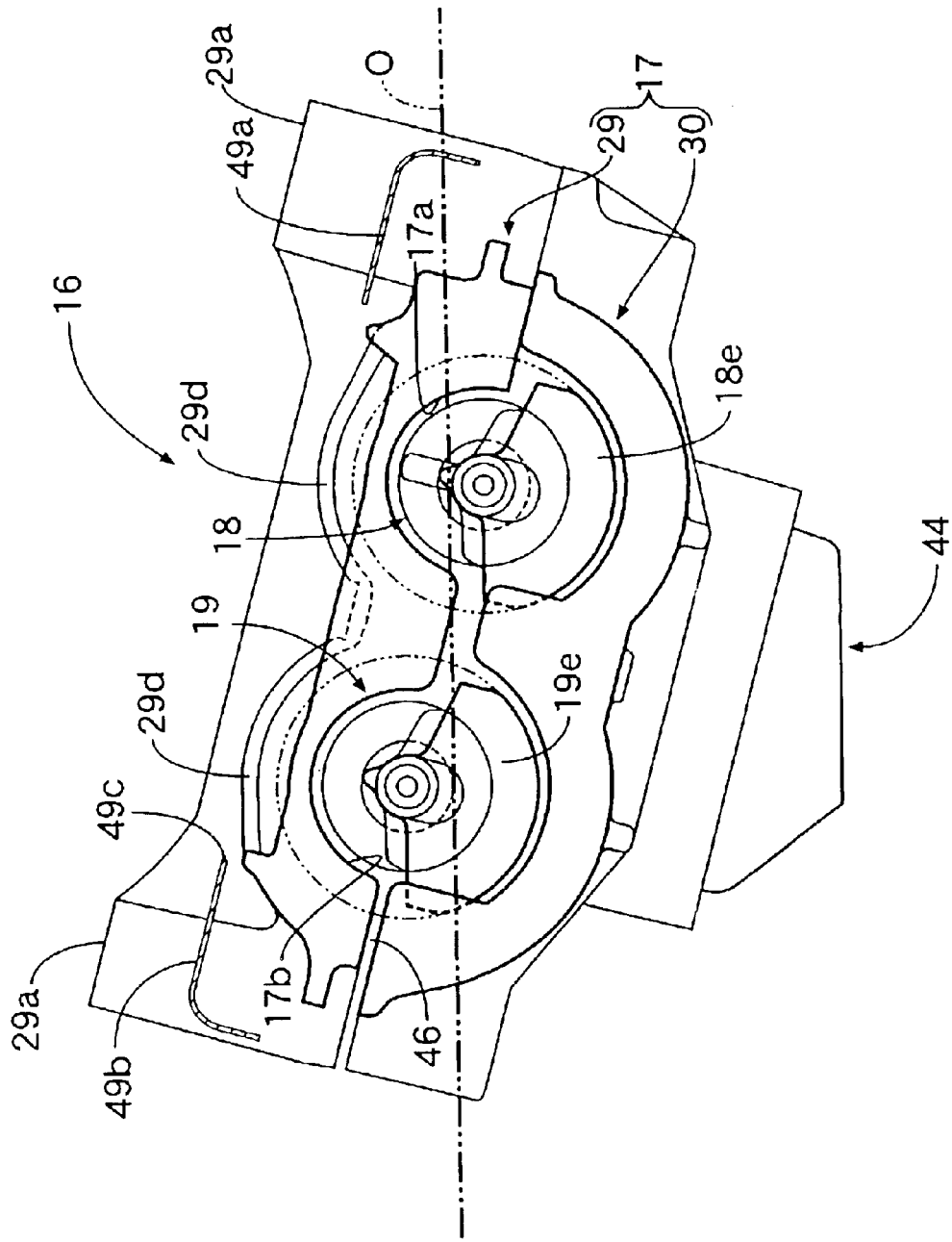
Figure 11:
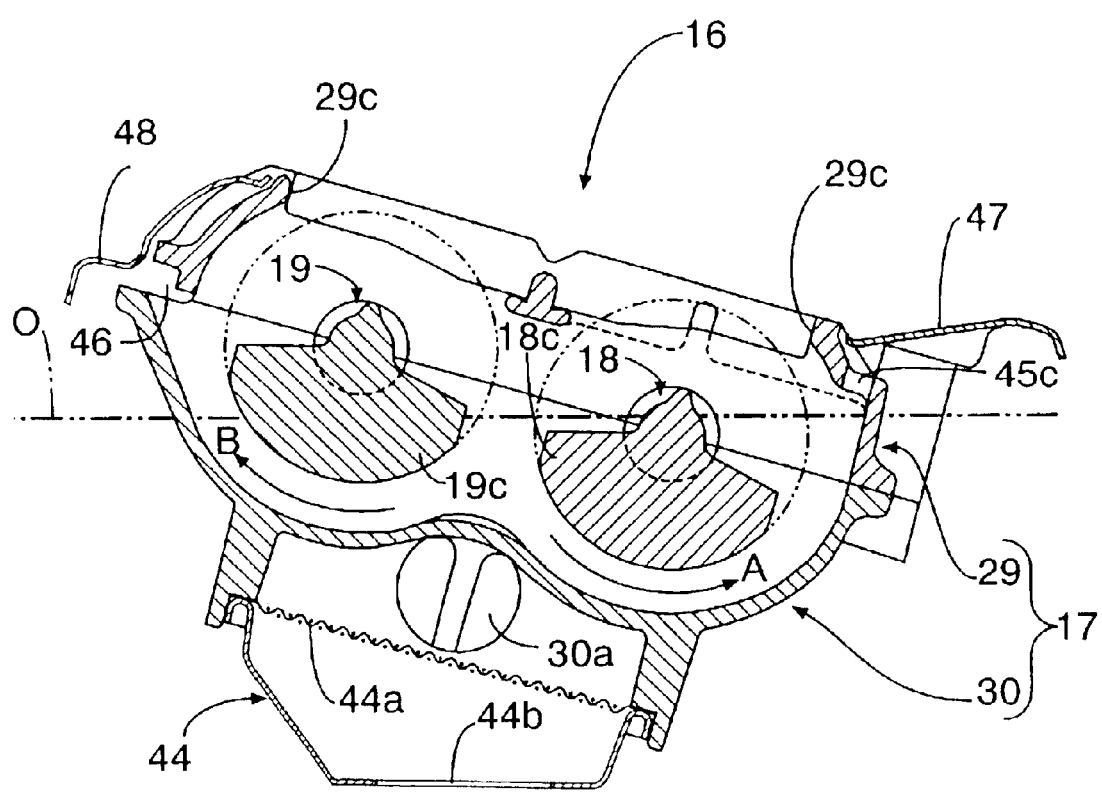
Figure 12:
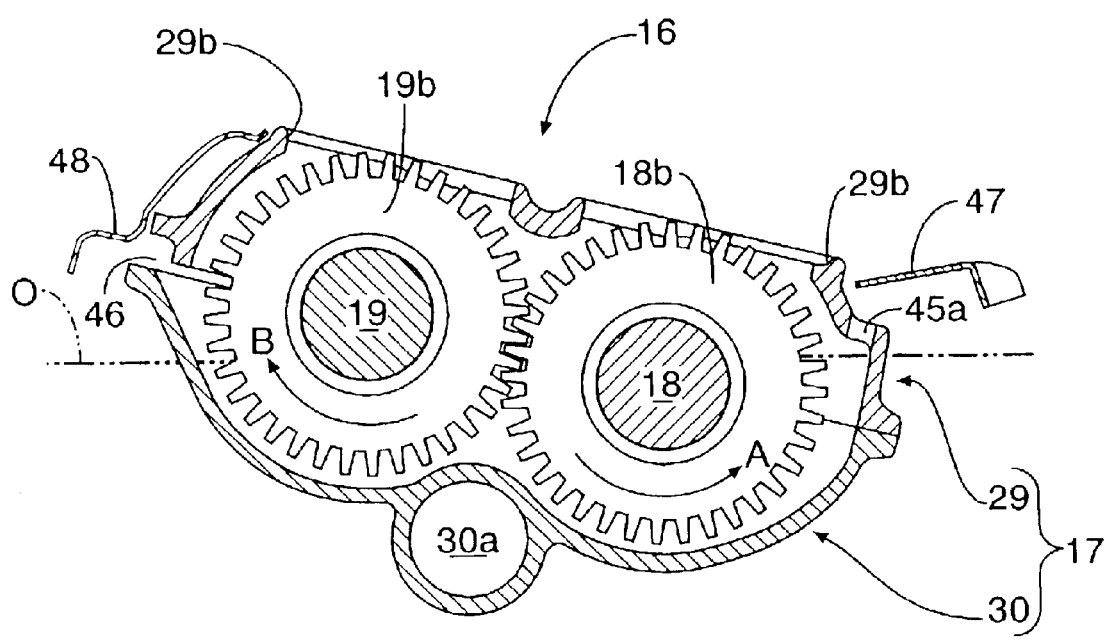

At this time, the oil discharged from the oil discharge bores 45a to 45d and 46 can be turned downwards and returned smoothly to the oil pan 15, because outer end edges of the first and second baffle plates 47 and 48 and outer end edge of cover portions 49a and 49b of the third baffle plate 49 are folded downwards, as shown in FIGS. 10 to 12.

The turbulence of the surface O of the oil stored in the oil pan 15 is prevented by the first and second baffle plates 47 and 48 fixed to the balancer housing 17 and the third baffle plate 49 fixed to the lower block 14. If a splash of the oil splashed up with the rotation of the crankshaft 20 is scattered into the crankcase, the oil splash can be shielded and prevented from entering the balance housing 17 through the oil discharge bores 45a to 45d and 46, because at least portions of the first, second and third baffle plates 47, 48 and 49 extend to positions where they cover the oil discharge bores 45a to 45d and 46 in the balancer housing 17. Since the oil discharge bores 45a to 45d and 46 are covered utilizing the existing first to third baffle plates 47, 48 and 49, as described above, special cover members for covering the oil discharge bores 45a to 45d and 46 are not required, thereby enabling reductions in the number of parts and the number of assembling steps.

Especially, the third baffle plate 49 formed into the angular U-shape includes the plurality of cover portions 49a and 49b for covering the plurality of oil discharge bores 45d and 46, and a notch 49c between the cover portions 49a and 49b and hence, an increase in weight of the third baffle plate 49 can be minimized by the provision of the notch 49c, while covering portions of the oil discharge bores 45d and 46 by the cover portions 49a and 49b. Moreover, two of the four bolts 50 for fixing the third baffle plate 49 to the lower block 14 are disposed at locations closer to the cover portions 49a and 49b than to the notch 49c and hence, the rigidity of the cover portions 49a and 49b can be increased to inhibit the vibration. In addition, the notch 49c is provided at a location opposed to the second balancer weights 18e and 19e having diameters larger than those of the second journals 18d and 19d of the driving balancer shaft 18 and the follower balancer shaft 19 and hence, an increase in vertical dimension of the engine E can be minimized.

The first baffle plate 47 serving as a cover member covers the plurality of oil discharge bores 45a to 45c in the form of openings, and the third baffle plate 49 serving as a cover member covers the plurality of oil discharge bores 45d and 46 in the form of openings, and namely, the plurality of openings are covered by the single cover member, leading to a reduction in the number of the covering members.

The third baffle plate 49 and the first baffle plate 47 are provided independently and separately from each other to cover the oil discharge bores 45c and 45d provided sideways (in a direction perpendicular to the driving balancer shaft 18) of the first and second balancer weights 18c and 18e mounted with the second journal 18d interposed therebetween. Therefore, the structure of connection between the first baffle plate 47 and the third baffle plate 49 around the second journal 18d cannot be complicated, and increases in sizes of the first and third baffle plates 47 and 49 serving as the cover members can be suppressed.

Figure 13:
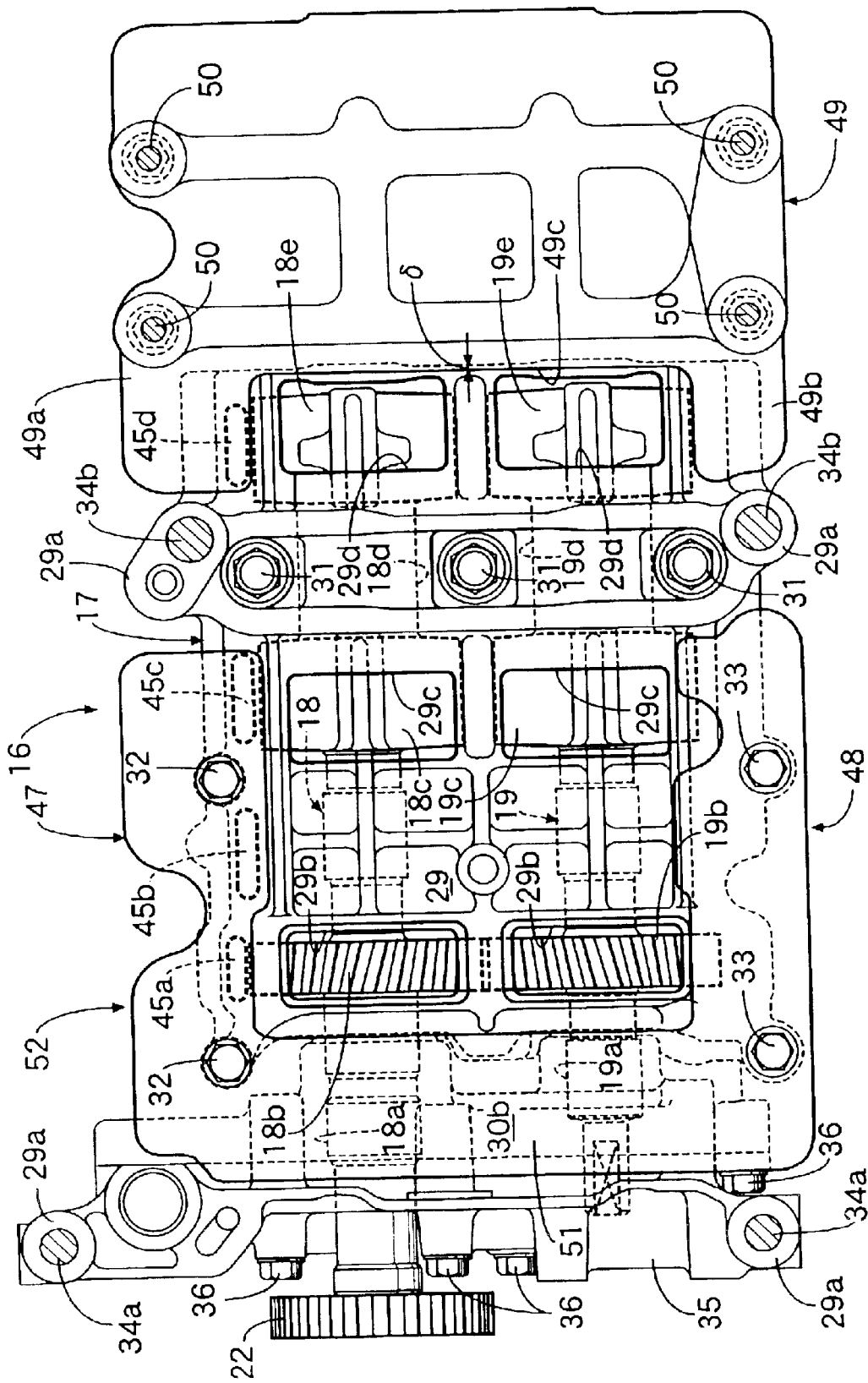
FIG. 13 is a view similar to FIG. 6, but according to a second embodiment of the present invention.

A second embodiment of the present invention will now be described with reference to FIG. 13.

In the second embodiment, a first baffle plate 47 and a second baffle plate 48 of the first embodiment are integrally connected to each other by a connection 51 to form a single angular U-shaped baffle plate 52, leading to a reduction in the number of parts. The shapes and functions of the first baffle plate 47 and the second baffle plate 48 are the same as in the first embodiment.

Figure 6:
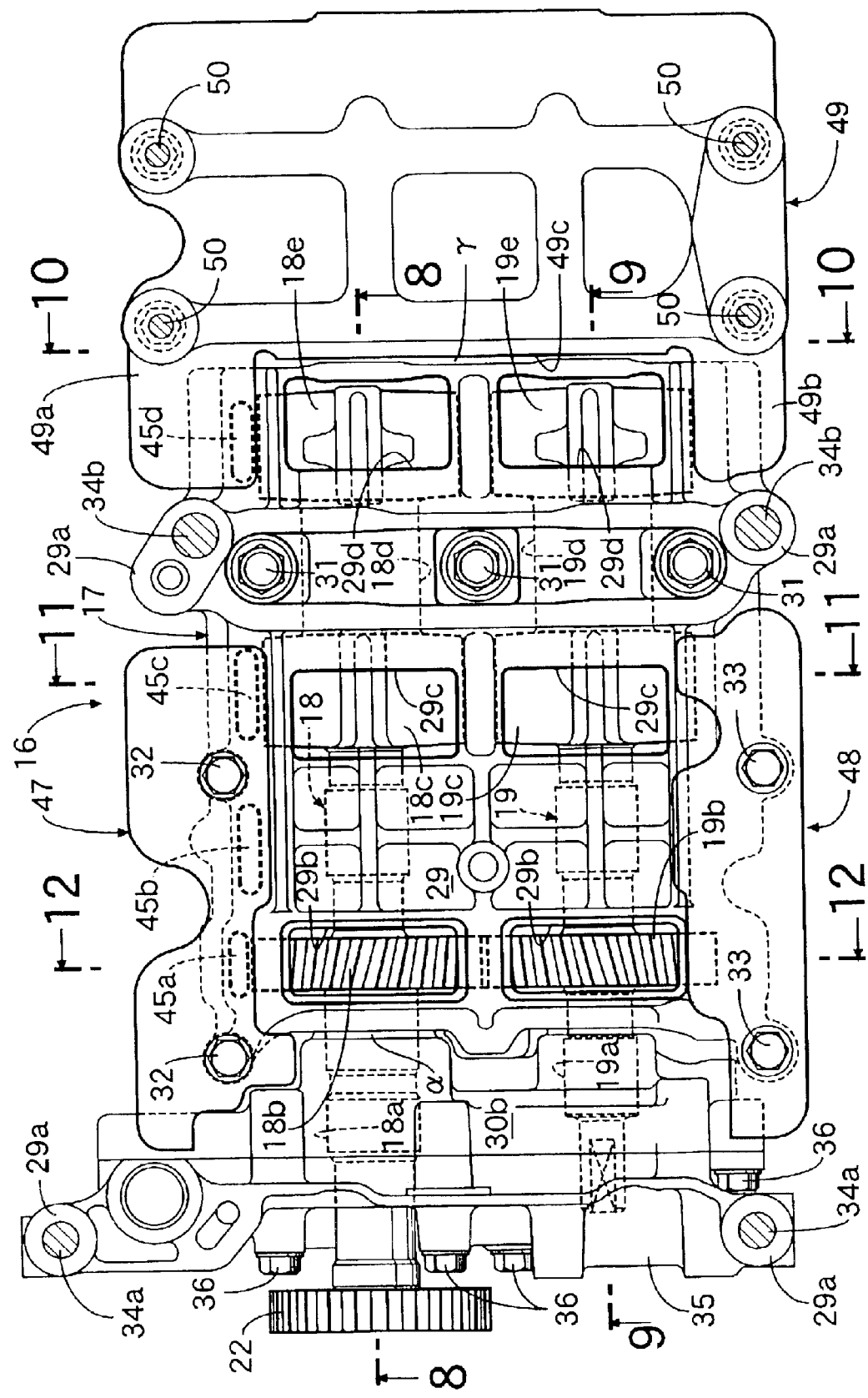
Figure 7:
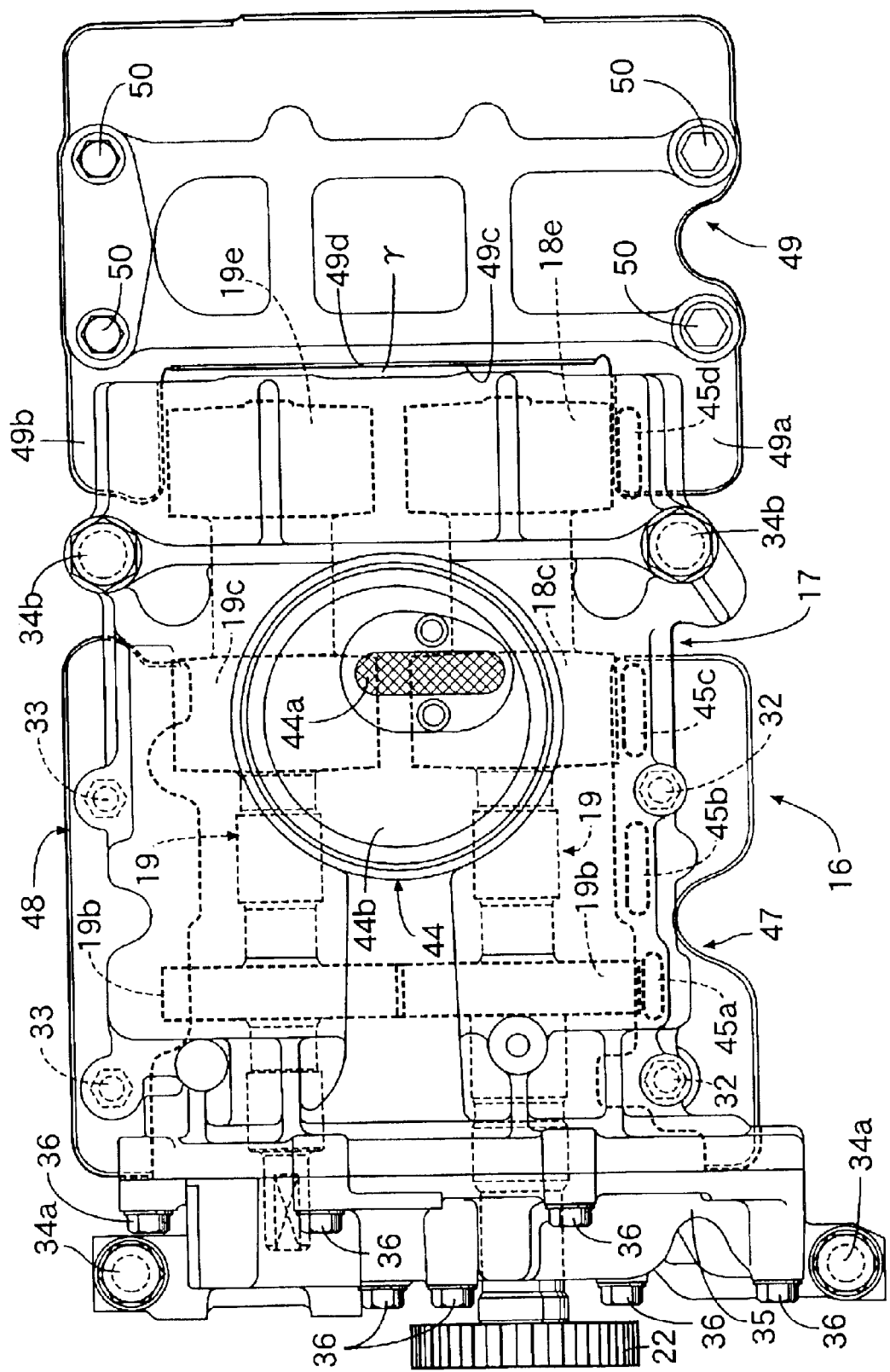

In the first embodiment shown in FIG. 6, a clearance γ (see FIGS. 6 and 7) is provided between the end edge of the angular U-shaped notch 49c in the third baffle plate 49 and the end edge of the balancer housing 17, but if the end edge of the angular U-shaped notch 49c in the third baffle plate 49 is overlapped on the end edge of the balancer housing 17 by a distance δ, the oil from above the third baffle plate 49 can be prevented from entering the balancer housing through the openings 17a and 17b provided in the end of the balancer housing 17.

Figure 14:
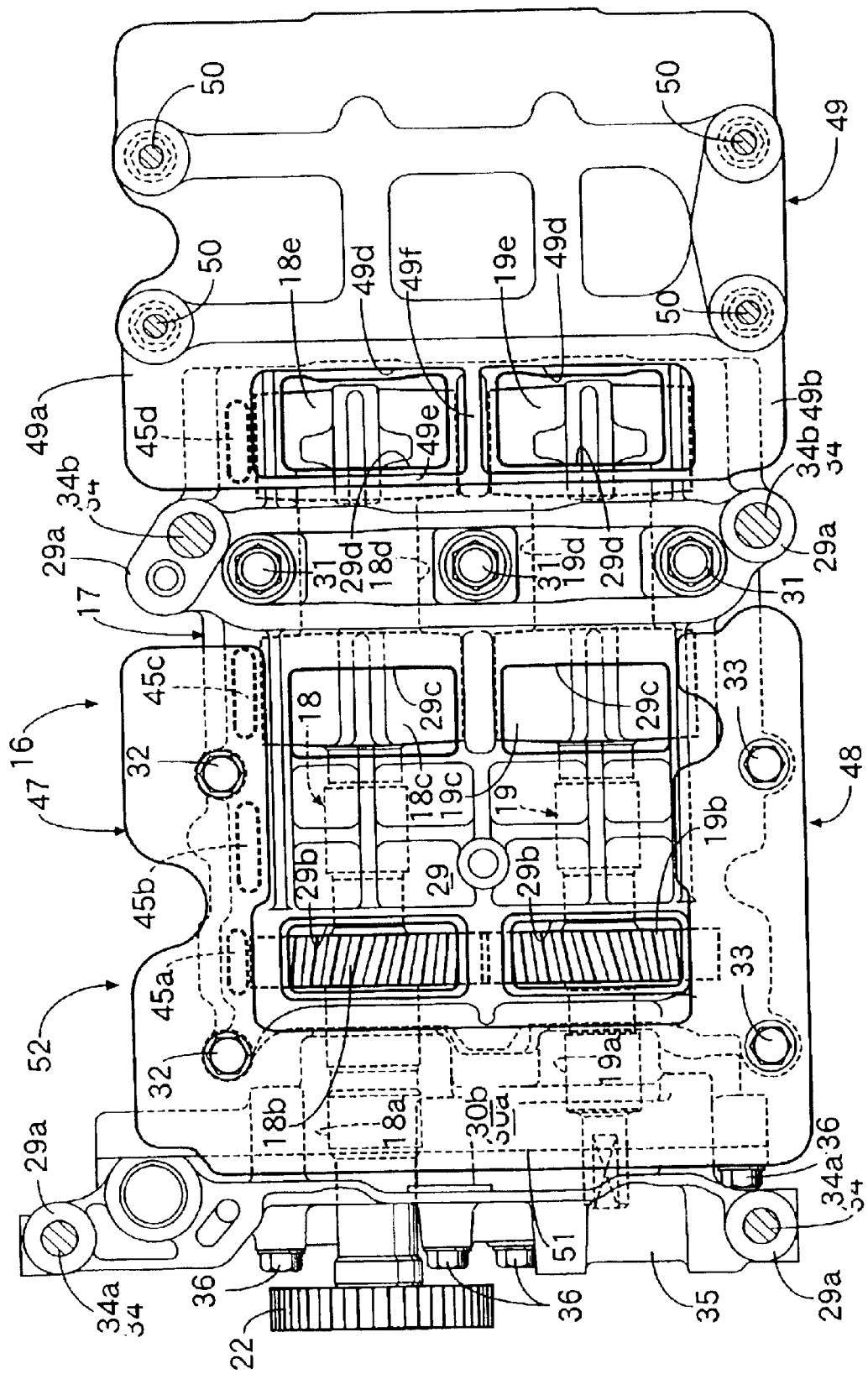
FIG. 14 is a view similar to FIG. 6, but according to a third embodiment of the present invention.

A third embodiment of the present invention will now be described with reference to FIG. 14.

In the first embodiment of the present invention shown in FIG. 6, the angular U-shaped notch 49c is defined between the pair of cover portions 49a and 49b of the third baffle plate 49, but in the third embodiment, a pair of bores 49d, 49d is defined between the cover portions 49a and 49b and opposed to a pair of openings 29d, 29d which the second balancer weights 18e and 19e face. With the third embodiment, the bores 49d, 49d exhibit the same function as that of the notch 49c in the first embodiment, whereby the rigidity of the cover portions 49a and 49b can be increased by T-shaped connecting walls 49e and 49f surrounding the bores 49d, 49d to inhibit the generation of the vibration further effectively, while reducing the weight of the third baffle plate 49 and reducing the vertical dimension of the engine E.

A fourth embodiment of the present invention will now be described with reference to FIGS. 15 to 18.

A rib-shaped projection 29e is formed on an upper surface of an upper housing element 29 immediately above the slit-shaped oil discharge bore 46 between the first and second journals 19a and 19d of the follower balancer shaft 19 to extend in the axial direction of the crankshaft 20. An inner end edge 48a of a second baffle plate 48 covering an area above the oil discharge bore 46 enters a space surrounded by a lower surface of the projection 29e and an upper surface of an upper housing element 29 and extends therefrom toward an outer end edge 48b.

On the other hand, a groove-shaped recess 29f is defined in the upper surface of the upper housing element 29 immediately above the two oil discharge bores 45b and 45c between the driving gear 18b and second journal 18d of the driving balancer shaft 18 to extend in the axial direction of the crankshaft 20. A downwardly-bent inner end edge 47a of a first baffle plate 47 covering an area above the oil discharge bores 45a to 45c enters the recess 29f and extends therefrom toward an outer end edge 47b.

Thus, when an oil deposited to the upper surface of the upper housing element 29 flows downwards toward the first baffle plate 47 by the force of gravity, the oil flows along the upper surface of the first baffle plate 47 to drop from the outer end edge 47b into the oil pan 15 without flowing around to go under the first baffle plate 47, that is, the oil is prevented from entering the balancer housing 17 through the oil discharge bores 45b and 45c, because the downwardly-bent inner end edge 47a of the first baffle plate 47 is fitted in the groove-shaped recess 29f so that the recess 29f blocks the flow of the oil.

In addition, when the oil deposited to the upper surface of the upper housing element 29 flows downwards toward the second baffle plate 47 by the force of gravity, the oil is prevented from entering the balancer housing 17 from the oil discharge bore 46 by blocking the flow of the oil by the bank-shaped projection 29e of the upper housing element 29 or by guiding the oil passing over the projection 29e to the upper surface of the second baffle plate 48 to drop the oil from the outer end edge 48b into the oil pan 15, because the inner end edge 48a of the second baffle plate 48 is located below the projection 29e of the upper housing element 29, and the projection 29e protrudes upwards to a level higher than the inner end edge 48a of the second baffle plate 48.

At this time, the oil can be guided smoothly to the oil pan 15, because the first and second baffle plates 47 and 48 are inclined downwards from the inner end edges 47a and 48a toward the outer end edges 47b and 48b.

The recess 29f defined in the upper housing element 29 in the axial direction of the crankshaft 20 has a length sufficient to cover the entirety of the two oil discharge bores 45b and 45c and hence, the oil flowing downwards along the upper surface of the upper housing element 29 can be blocked reliably and prevented from flowing around to the lower surface of the first baffle plate 47. In the present embodiment, the oil discharge bore 46 defined between mating surfaces of the upper and lower housing elements 29 and 30 protrudes axially from the projection 29e formed on the upper housing element 29, but if the oil discharge bore 46 is defined only within the extent of the projection 29e, namely, if the length of the projection 29e is set larger than that of the oil discharge bore 46, the oil flowing downwards along the upper surface of the upper housing element 29 can be blocked by the projection 29e and prevented further reliably from entering the balancer housing 17.

A bearing portion 29g for supporting the second journals 18d and 19d of the driving balancer shaft 18 and the follower balancer shaft 19 and a gear-accommodating portion 29h for accommodating the driving gear 18b and the follower gear 19b protrude upward from the upper surface of the upper housing element 29, and are connected to each other by the projection 29e. Therefore, the rigidity of the upper housing element 29 can be increased effectively to reliably support the driving balancer shaft 18 and the follower balancer shaft 19.

Figure 15:
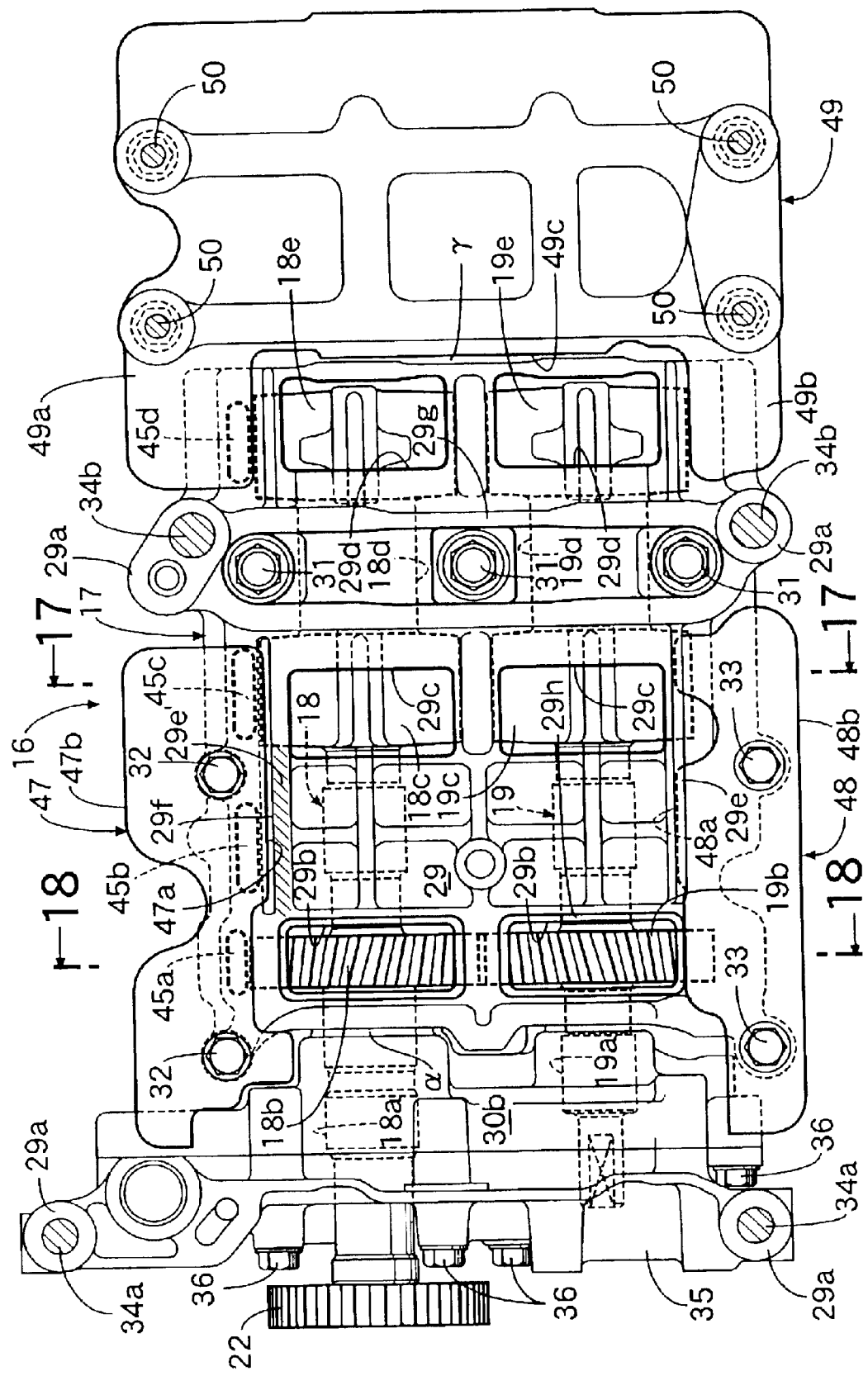
Figure 16:
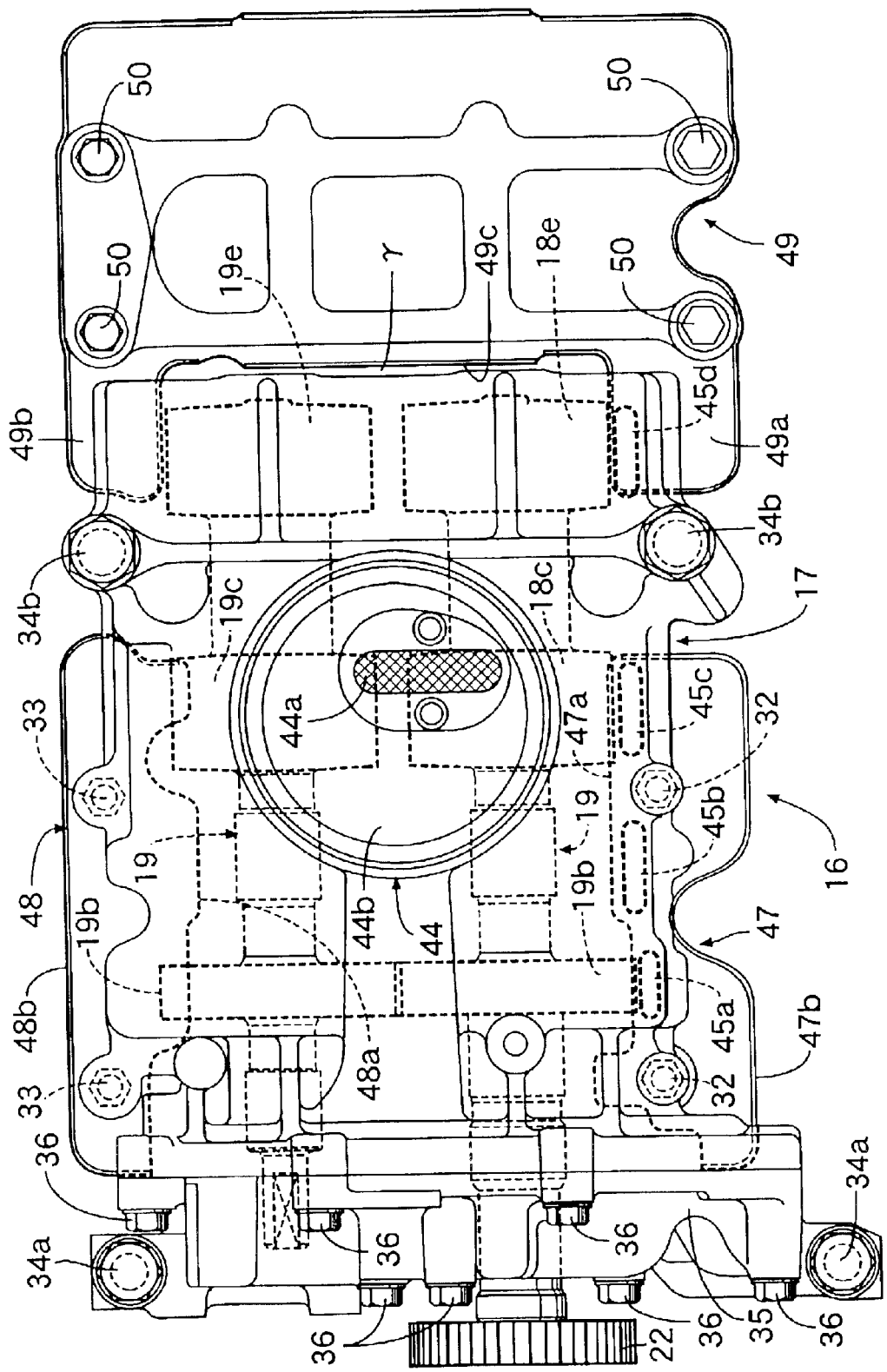
Figure 17:
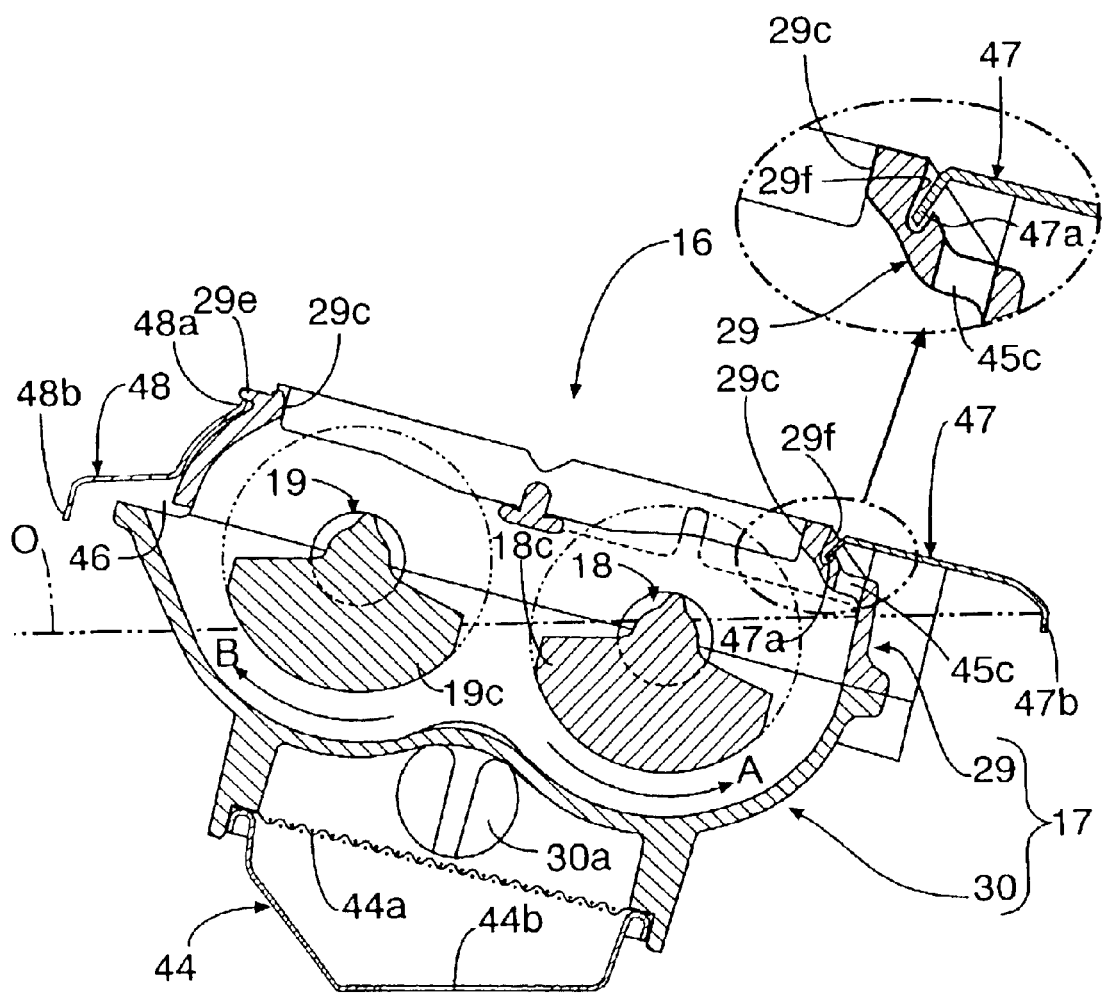
Figure 18:
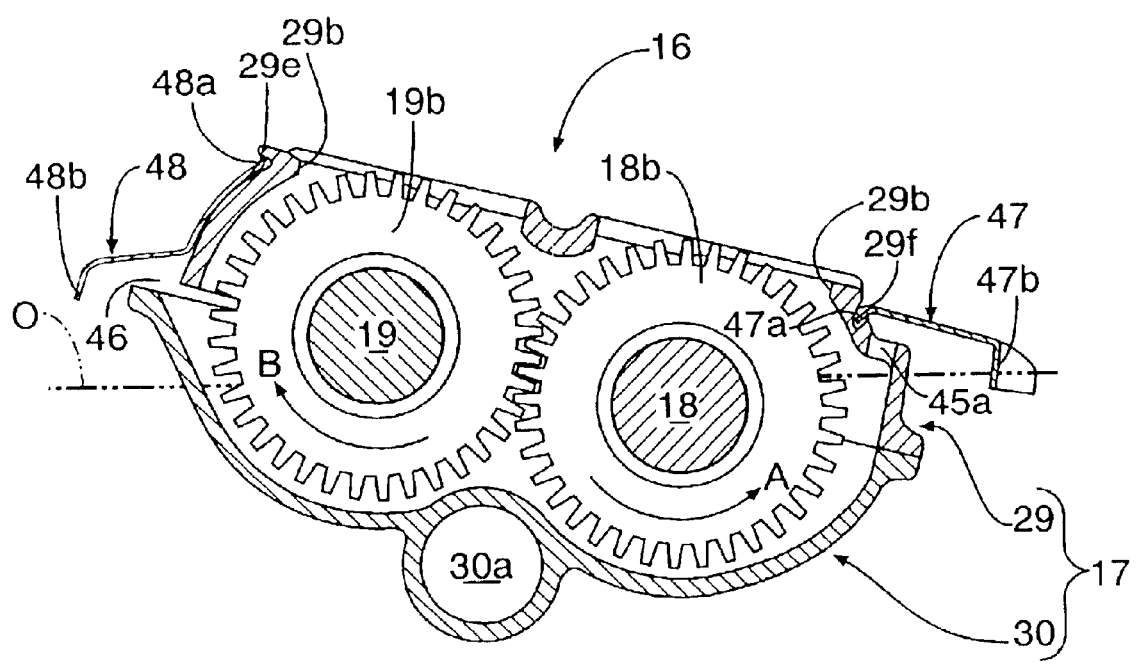

A hatched portion shown in FIG. 15 is a projection 29e', and the entrance of the oil into the oil discharge bore 45b can be inhibited further effectively by cooperation between the projection 29e' and the recess 29f below the projection 29e'. Moreover, the gear-accommodating portion 29h and the opening 29c allowing the movement of the balancer weight 18e are connected to each other by the projection 29e', which can contribute to an increase in rigidity of the balancer housing 17.

Figure 19:
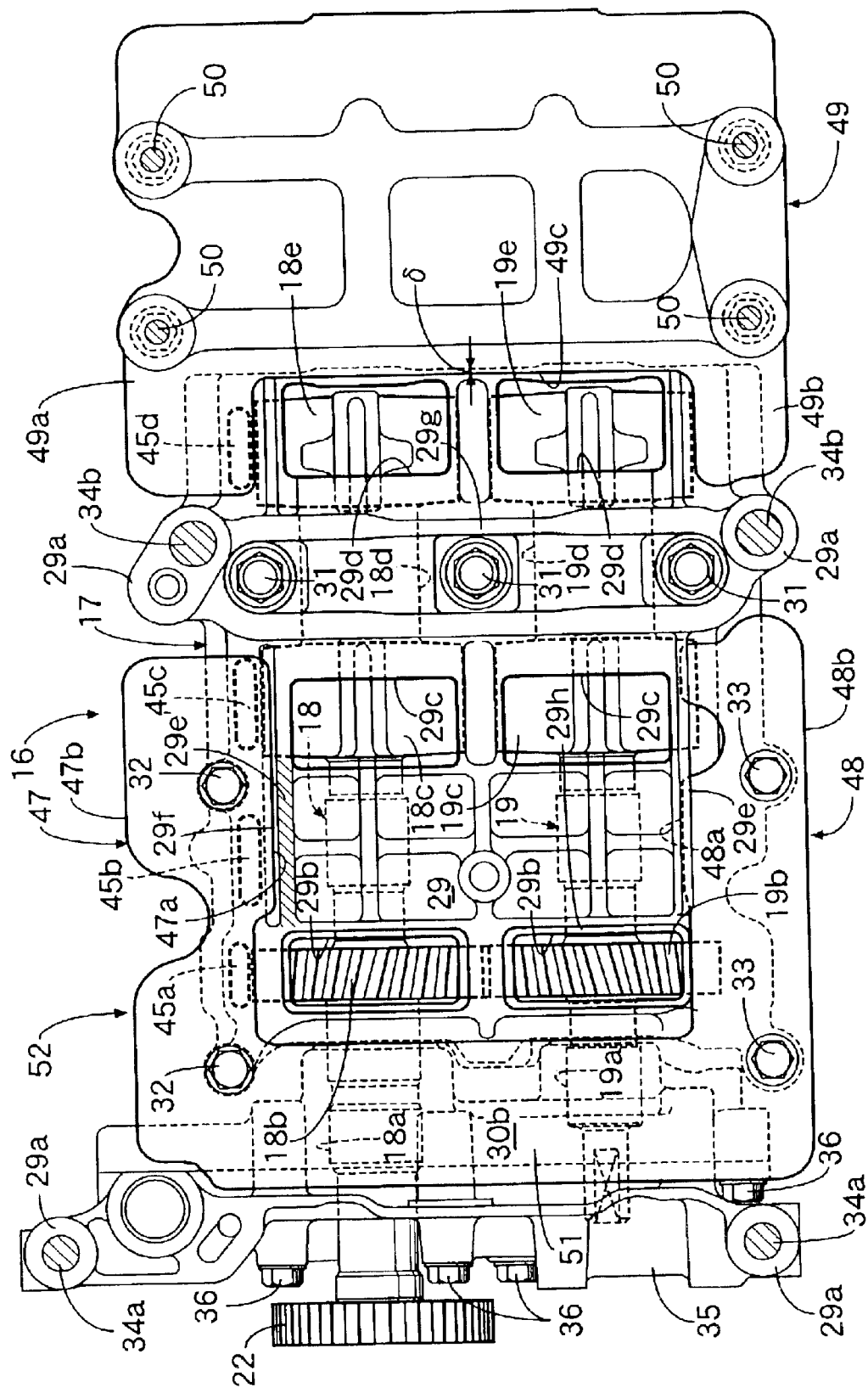
FIG. 19 is a view similar to FIG. 6, but according to a fifth embodiment of the present invention.

A fifth embodiment of the present invention will be described below with reference to FIG. 19.

In the fifth embodiment, a first baffle plate 47 and a second baffle plate 48 of the fourth embodiment are connected integrally to each other by a connection 51 to form a single angular U-shaped baffle plate 52, leading to a reduction in the number of parts. The shapes and functions of the first baffle plate 47 and the second baffle plate 48 are the same as those in fourth embodiment.

Although the embodiments of the present invention have been described in detail, it will be understood that the present invention is not limited to the above-described embodiments, and various modifications in design may be made without departing from the spirit and scope of the invention defined in the claims.

For example, in each of the embodiments, the first and second baffle plates 47 and 48 are fixed to the balancer housing 17, and the third baffle plate 49 is fixed to the lower block 14, but their mounting positions can be appropriately changed.

In addition, the openings in the balancer housing 17 are not limited to the oil discharge bores 45a to 45d and 46 in each of the embodiments, and may be of any desired form such as a breather bore and the like.

Further, if opposite ends of each of the projections 29e, 29e' and the recess 29f extending in the axial direction of the crankshaft 20 are bent downwards, the oil blocked by the projections 29e, 29e' and the recess 29f can be dropped from such opposite ends into the oil pan 15 and prevented further effectively from entering the balancer housing 17.

What is claimed is:

1. A balancer device for an engine, comprising a balancer housing disposed below a crankshaft to face an oil pan, wherein at least a portion of a baffle plate for inhibiting a turbulence of a surface of an oil stored in said oil pan is extended to a location where it covers an opening defined in said balancer housing, wherein said baffle plate has a plurality of cover portions for respectively covering a plurality of the openings, and a notch or a bore is defined between said cover portions, wherein said notch or said bore is provided at a location opposed to a balancer weight having a diameter larger than that of a journal of a balancer shaft.

2. A balancer device for an engine according to claim 1, wherein a location at which said baffle plate is fastened to a support member is a location closer to said cover portions than to said notch or said bore.

3. A balancer device for an engine according to claim 1, wherein a projection or a recess for inhibiting the flowing of the oil into a clearance defined between an upper surface of the balancer housing and an end edge of the baffle plate is formed on an upper surface of said balancer housing in order to inhibit the entrance of the oil into the opening through said clearance.

4. A balancer device for an engine, comprising a balancer housing disposed below a crankshaft to face an oil pan, wherein at least a portion of a baffle plate for inhibiting a turbulence of a surface of an oil stored in said oil pan is extended to a location where it covers an opening defined in said balancer housing, wherein a projection for inhibiting the flowing of the oil into a clearance defined between an upper surface of the balancer housing and an end edge of the baffle plate is formed on the upper surface of said balancer housing to protrude upwards to a level higher than the end edge of said baffle plate in order to inhibit the entrance of the oil into the opening through said clearance.

5. A balancer device for an engine according to claim 3 or 4, wherein the length of said projection or said recess in a direction of the balancer shaft is set to be larger than the length of said opening in the direction of the balancer shaft.

6. A balancer device for an engine according to claim 4, wherein said balancer housing has bearing portions for supporting journals of two balancer shafts, and a gear-accommodating portion for accommodating gears adapted to drive the two balancer shafts in operable association with each other, said bearing portions and said gear-accommodating portion being projectingly provided on the upper surface of said balancer housing and connected to each other by said projection.

* * * * *